(12) United States Patent
Kawanishi

(10) Patent No.: US 10,601,275 B2
(45) Date of Patent: Mar. 24, 2020

(54) INSULATING MATERIAL FOR COIL

(71) Applicant: TOYOTA JIDOSHA KABUSHIKI KAISHA, Toyota-shi, Aichi-ken (JP)

(72) Inventor: Yoshitomo Kawanishi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 104 days.

(21) Appl. No.: 15/814,893

(22) Filed: Nov. 16, 2017

(65) Prior Publication Data

US 2018/0159395 A1 Jun. 7, 2018

(30) Foreign Application Priority Data

Dec. 1, 2016 (JP) .................. 2016-233984

(51) Int. Cl.
| | |
|---|---|
| H05K 3/34 | (2006.01) |
| H02K 3/34 | (2006.01) |
| H02K 15/10 | (2006.01) |
| H02K 3/52 | (2006.01) |
| H02K 15/12 | (2006.01) |
| H02K 3/30 | (2006.01) |
| H02K 15/04 | (2006.01) |

(52) U.S. Cl.
CPC .............. *H02K 3/345* (2013.01); *H02K 3/30* (2013.01); *H02K 3/522* (2013.01); *H02K 15/10* (2013.01); *H02K 15/12* (2013.01); H02K 15/0435 (2013.01); H02K 2203/12 (2013.01); H02K 2213/09 (2013.01)

(58) Field of Classification Search
None
See application file for complete search history.

(56) References Cited

U.S. PATENT DOCUMENTS

2013/0300248 A1   11/2013   Ishida et al.

FOREIGN PATENT DOCUMENTS

| EP | 3284793 A1 | | 2/2018 |
|---|---|---|---|
| JP | 06-225489 A | | 8/1994 |
| JP | 06225489 A | * | 8/1994 |
| JP | 2013-6999 A | | 1/2013 |
| SU | 1012391 A | | 4/1983 |
| WO | 2016163514 A1 | | 10/2016 |

OTHER PUBLICATIONS

Inoue, S, Stator Coil of High Voltage Rotary Apparatus, Aug. 12, 1994, machine translation of JP06-225489 (Year: 1994).*

* cited by examiner

*Primary Examiner* — Chinessa T. Golden
(74) *Attorney, Agent, or Firm* — Sughrue Mion, PLLC

(57) ABSTRACT

A stator-core-side expansive additive layer and a coil-side expansive additive layer include foam materials foaming by heating. A foam material included in the stator-core-side expansive additive layer has such a foaming characteristic that an increase characteristic of a foaming rate along with a temperature rise is shifted to a cold side relative to the increase characteristic of a foam material included in the coil-side expansive additive layer.

2 Claims, 9 Drawing Sheets

INSULATING MATERIAL FOR COIL

INCORPORATION BY REFERENCE

The disclosure of Japanese Patent Application No. 2016-233984 filed on Dec. 1, 2016 including the specification, drawings and abstract is incorporated herein by reference in its entirety.

BACKGROUND

1. Technical Field

The present disclosure relates to an insulating material for a coil, the insulating material being placed between a stator core and a coil and configured to insulate the coil from the stator core.

2. Description of Related Art

A stator of a rotary electric machine includes a stator core and a coil assembled to teeth of the stator core. An insulating material is placed between the stator core and the coil so as to prevent electric conduction therebetween.

In Japanese Patent Application Publication No. 6-225489 (JP 6-225489 A), a fixing function of a coil is added to an insulating material. That is, the insulating material includes an insulating paper, and an expansive additive layer laminated thereon. When a stator assembly configured such that the insulating material and the coil are assembled to the stator core is heated in a heating furnace and the like, a foam material included in the expansive additive layer foams and expands. Due to an expansion pressure at this time and an adhesive included in the expansive additive layer, the coil is fixed to the stator core. When the insulating material has the fixing function of the coil as such, a step of filling an adhesive such as a varnish into a slot is omissible, which yields such an advantage that a manufacturing time can be shortened.

SUMMARY

In the meantime, when the expansive additive layer is provided on either side of the insulating paper, that is, on each of a coil side and a stator core side thereof, a fixing force (retentivity) of the coil may not be obtained sufficiently depending on a temperature difference between the coil and the stator core at the time of heating, as described below.

Generally, a foaming rate of the foam material has a temperature dependence. For example, as illustrated in FIG. 7, the foam material has such a foaming characteristic that a foaming rate increases along with a temperature rise from a foaming starting temperature T0, and then, the foaming rate decreases after a peak temperature Tp.

Further, in a case where the stator assembly configured such that the insulating material and the coil are assembled to the stator core is heated in the heating furnace and the like, a temperature difference occurs between the coil and the stator core. That is, the stator core generally has a larger mass than the coil. Further, in a case where the coil is made of a copper wire and the stator core is made of a steel sheet, a specific heat is relatively high in the stator core (the stator core is hard to warm). That is, in comparison with the coil, the stator core has a large heat capacity, which is expressed as a product of the mass and the specific heat. As a result, in a course of heating the stator assembly in the heating furnace to the peak temperature Tp, a temperature rise of the stator core delays from a temperature rise of the coil. Along with this, as illustrated on an upper side in FIG. 8, a temperature rise of a stator-core-side expansive additive layer delays from a temperature rise of a coil-side expansive additive layer.

Along with the delay in the temperature rise of the stator-core-side expansive additive layer, a time difference occurs in a timing to reach the foaming starting temperature T0, as illustrated on a lower side in FIG. 8 and an upper side in FIG. 9. In addition, a difference occurs between a foaming rate (a response probability of a foam material) of the coil-side expansive additive layer and a foaming rate of the stator-core-side expansive additive layer after that, so that the foaming rate of the stator-core-side expansive additive layer, which is on a relatively cold side, becomes relatively low. Consequently, as illustrated in FIG. 9, the coil-side expansive additive layer 102 expands ahead of the stator-core-side expansive additive layer 104 so as to fill a gap of a slot 106, so that their respective expansion coefficients (volume increasing rates) become ununiform. Particularly, the coil-side expansive additive layer 102 expands to a space to be filled with the stator-core-side expansive additive layer 104 in design, as illustrated on a lower side in FIG. 9, which might cause so-called excessive foaming (overexpansion). When a porosity of the coil-side expansive additive layer 102 increases along with the excessive foaming, in other words, when a density of the coil-side expansive additive layer 102 decreases (becomes porous), a retentivity of the coil-side expansive additive layer 102 decreases by just that much, so that a sufficient retentivity for the coil 108 may not be obtained.

In view of this, the present disclosure provides an insulating material for a coil, the insulating material being able to reduce a difference in a foaming rate between a coil-side expansive additive layer and a stator-core-side expansive additive layer along with a temperature difference, as compared to the related art.

An insulating material for a coil in the present disclosure is placed between a stator core and a coil and configured to insulate the coil from the stator core. The insulating material includes: an insulating sheet made of an insulating material; a stator-core-side expansive additive layer laminated on a surface of the insulating sheet, the surface being opposed to the stator core, in a state where the insulating sheet is placed between the stator core and the coil, the stator-core-side expansive additive layer including a first foam material configured to foam by heating; and a coil-side expansive additive layer laminated on a surface of the insulating sheet, the surface being opposed to the coil, in a state where the insulating sheet is placed between the stator core and the coil, the coil-side expansive additive layer including a second foam material configured to foam by heating. The first foam material has such a foaming characteristic that an increase characteristic of a foaming rate along with a temperature rise is shifted to a cold side relative to an increase characteristic of the second foam material.

According to the present disclosure, the foam material on a stator core side starts foaming at a lower temperature as compared to the foam material on a coil side, and has such a foaming characteristic that an increasing rate of a foaming rate after the foaming start changes in a state offset to a lower temperature side. Hereby, even in a case where a temperature rise of the stator core is slow as compared to the coil and a temperature of the stator core is relatively low, it is possible to reduce a difference in the foaming rate between the foam material on the coil side and the foam material on the stator core side, as compared to the related art.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
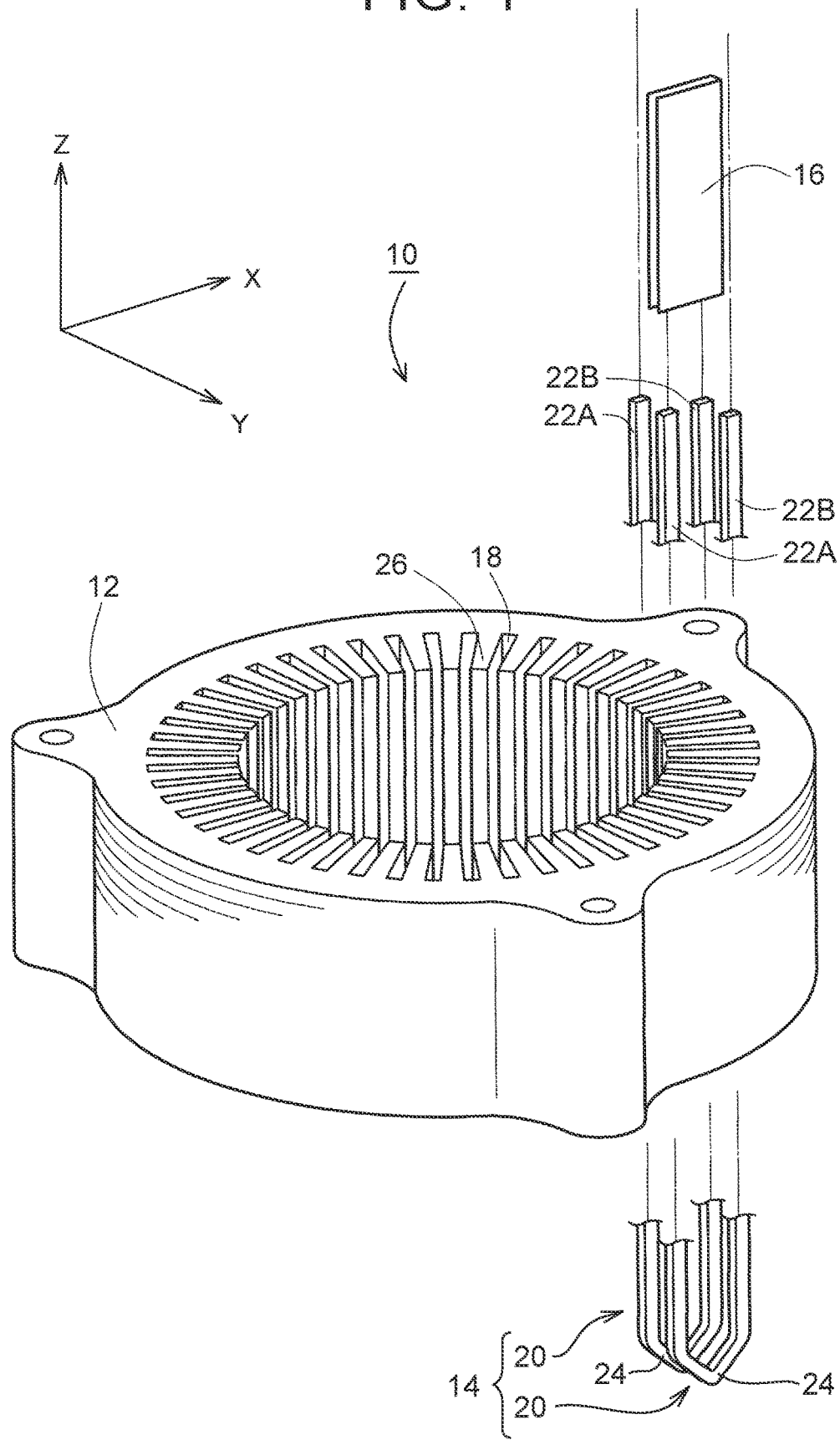
FIG. 1 is an exploded perspective view exemplifying a stator according to the present embodiment.

FIG. 1 exemplifies a stator 10 according to the present embodiment. The stator 10 is, for example, a stator for a rotary electric machine serving as a drive source for a vehicle including a large power source (a battery), such as a hybrid vehicle, an electric vehicle, and a fuel cell vehicle. The stator 10 includes a stator core 12, a coil 14, and an insulating material 16.

Figure 3:
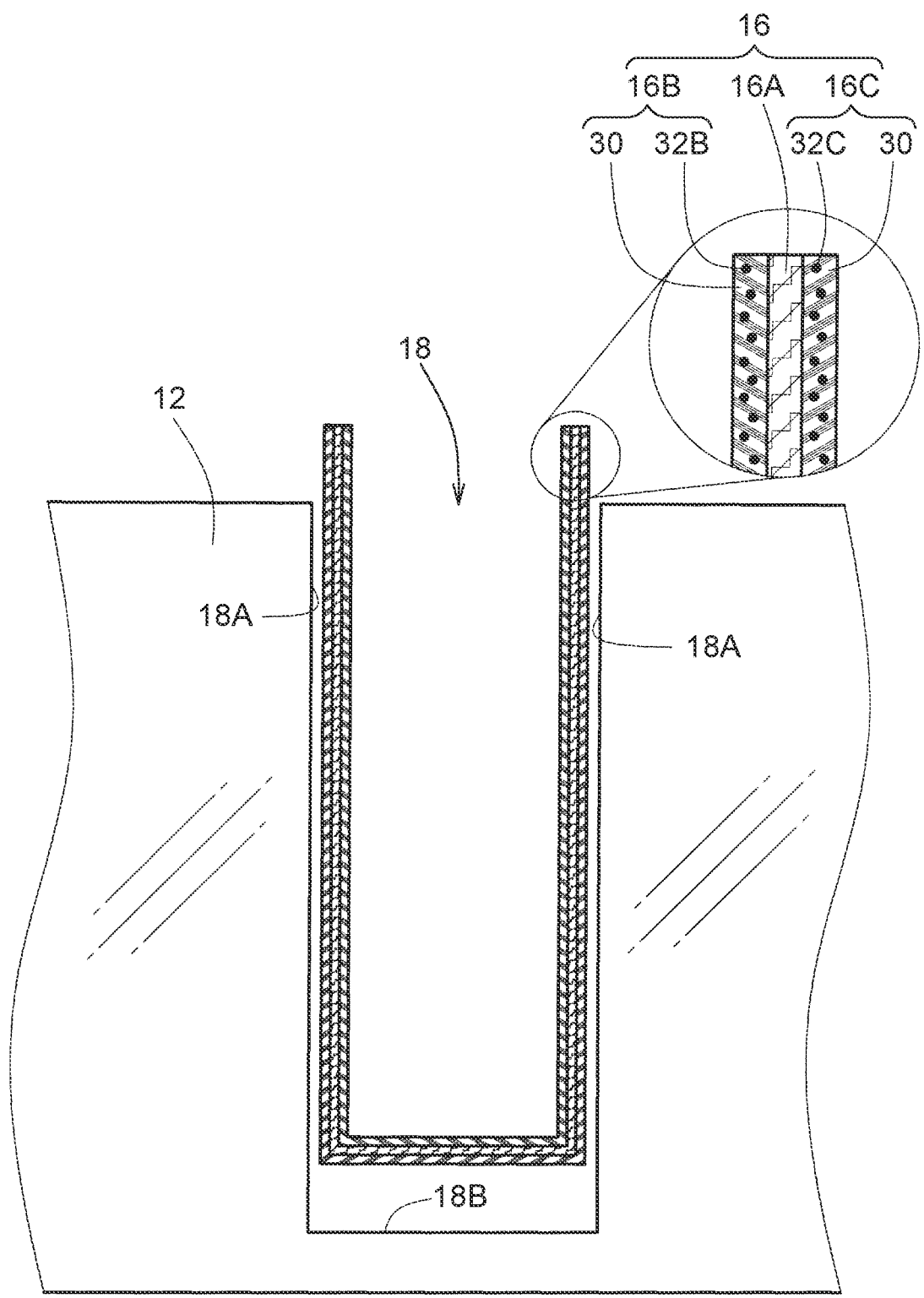
FIG. 3 is a view to describe an assembly step (an insulating material insertion step) of the stator according to the present embodiment.

The stator core 12 is a member serving as a passage (a magnetic path) for magnetic fluxes formed by the coil 14, and is constituted, for example, by a generally cylindrical laminated body configured such that a plurality of electromagnetic steel sheets having a generally annular flat shape is laminated along their central axis (a Z-axis direction in FIG. 1). A slot 18 cut to penetrate through both ends of the stator core 12 in an axial direction (a Z-axis) and to have a depth in a radial direction is formed on an inner peripheral surface of the stator core 12. For example, as illustrated in FIG. 3, the slot 18 is formed to have a lateral square-U-shape, when viewed from the axial direction (the Z-axis direction). A plurality of slots 18 is formed along a circumferential direction of the stator core 12.

The coil 14 is assembled to be wound around teeth 26 of the stator core 12, so as to generate a rotating magnetic field by an alternating current supplied from an inverter or the like (not shown). In the example illustrated in FIG. 1, the coil 14 is formed such that a plurality of conductor segments 20 is connected to each other. For example, in a case where the stator 10 is a three-phase alternating current stator, the conductor segments 20 are connected for each of a U-phase, a V-phase, and a W-phase.

Figure 4:
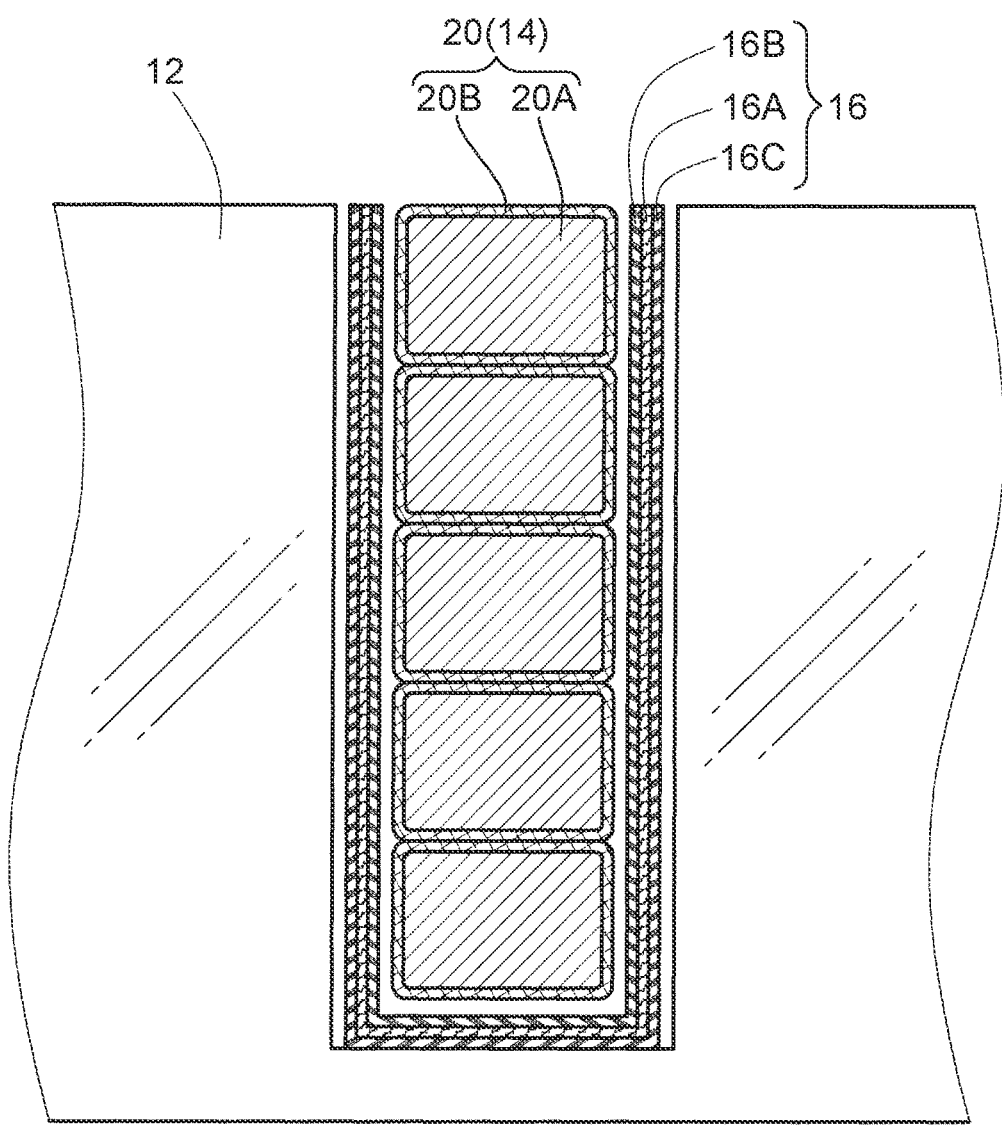
FIG. 4 is a view to describe an assembly step (a coil insertion step) of the stator according to the present embodiment.

As illustrated in FIG. 4, for example, the conductor segment 20 includes a conductive portion 20A, and an insulating coating portion 20B provided around the conductive portion 20A. The conductive portion 20A contains copper, for example. Further, the conductor segment 20 may be a so-called flat wire, and is formed so that its section has a generally rectangular shape.

Referring back to FIG. 1, the conductor segment 20 has a U-shape and includes two linear leg portions 22A, 22B, and a coupling portion 24 that connects them to each other. At the time of assembling of the coil 14, the leg portions 22A, 22B are inserted into the slots 18 of the stator core 12. The leg portions 22A, 22B are inserted into different slots 18, 18. In other words, the leg portions 22A, 22B of the conductor segment 20 are inserted into respective slots 18, 18 so as to step over the tooth 26 between the slots 18, 18. After that, among the plurality of conductor segments 20, 20, . . . , the leg portions 22A, 22B of the same phase are joined to each other by welding and the like.

The insulating material 16 is placed between the stator core 12 and the coil 14 (provided so as to be sandwiched therebetween), so as to insulate the coil 14 from the stator core 12. The insulating material 16 may have the same shape as a groove shape of the slot 18, for example, and is inserted into the slot 18 so as to cover an entire inner wall surface (both side surfaces 18A and a bottom surface 18B in FIG. 3) of the slot 18.

As exemplified in FIG. 3, the insulating material 16 includes an insulating sheet 16A (an insulating base material), a coil-side expansive additive layer 16B, and a stator-core-side expansive additive layer 16C. The insulating sheet 16A is constituted, for example, by a plane sheet made of an insulating material such as cellulose paper.

When the insulating material 16 is placed between the stator core 12 and the coil 14, the coil-side expansive additive layer 16B is laminated on a surface of the insulating sheet 16A, the surface being opposed to the coil 14 (the conductor segment 20). Further, when the insulating material 16 is placed between the stator core 12 and the coil 14, the stator-core-side expansive additive layer 16C is laminated on a surface of the insulating sheet 16A, the surface being opposed to the stator core 12 (the inner peripheral surface of the slot 18).

The coil-side expansive additive layer 16B and the stator-core-side expansive additive layer 16C are each constituted by a base layer 30, and a foam material 32 included in the base layer 30. Note that the coil-side expansive additive layer 16B and the stator-core-side expansive additive layer 16C are formed so as to have the same thickness, for example.

The base layer 30 includes thermoplastic resin that causes an adhesiveness by heating, for example. For example, in the coil-side expansive additive layer 16B and the stator-core-side expansive additive layer 16C, the base layer 30 includes any of acryl resin, epoxy resin, and vinyl ester resin, or a mixture thereof.

The foam material 32 is dispersed in the base layer 30, and foams by heating. For example, the foam material 32 may be a thermal-decomposition foam material. In this case, in order to avoid a thermal decomposition reaction (foaming) from occurring due to heat generated along with driving of the rotary electric machine, it is preferable that a foaming starting temperature (a decomposition starting temperature) of the foam material 32 be higher than an upper limit temperature determined for the rotary electric machine.

More specifically, the foam material 32 may be a foam material including, as a main component, any one of dinitrosopentamethylenetetramine (DPT), azodicarbonamide (ADCA), p,p'-oxybis benzene sulfonyl hydrazide (OBSH), and sodium hydrogen carbonate.

Further, a foam material 32C (hereinafter referred to as a stator-core-side foam material 32C appropriately) included in the stator-core-side expansive additive layer 16C has such a foaming characteristic that an increase characteristic of a foaming rate along with a temperature rise is shifted to a cold side relative to a foam material 32B (hereinafter referred to as a coil-side foam material 32B appropriately) included in the coil-side expansive additive layer 16B.

Figure 2:
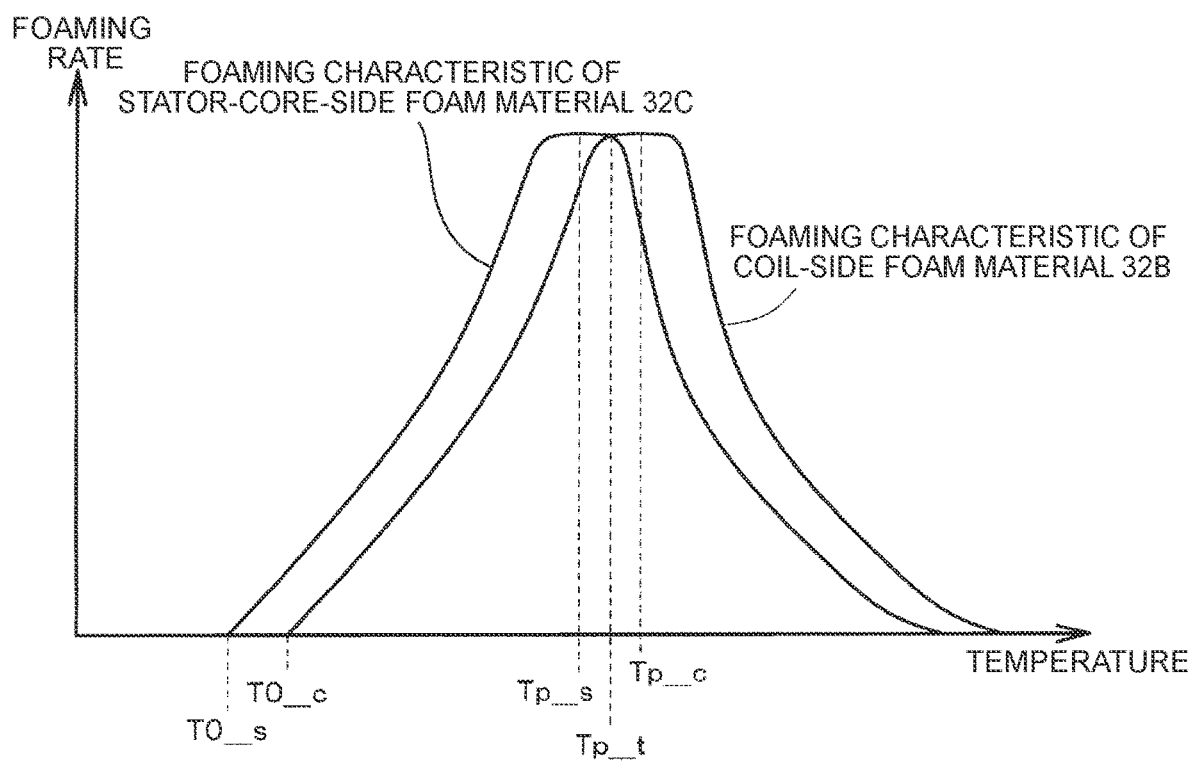
FIG. 2 is a view exemplifying a foaming characteristic of a foam material according to the present embodiment.

FIG. 2 exemplifies foaming characteristics (foaming curves) of the stator-core-side foam material 32C and the coil-side foam material 32B. A horizontal axis indicates a temperature, and a vertical axis indicates a foaming rate. As illustrated in the foaming characteristics (the foaming curves), the stator-core-side foam material 32C and the coil-side foam material 32B have such a characteristic that their respective foaming rates increase from respective foaming starting temperatures $T0\_s$, $T0\_c$ toward respective peak temperatures $Tp\_s$, $Tp\_c$ along with temperature rises, and the foaming rates decrease after the peak temperatures. Among them, a characteristic (an increase curve) in which the foaming rate increases along with the temperature rise toward the peak temperature is an increase characteristic, and a characteristic (a decrease curve) in which the foaming rate decreases along with the temperature rise after the peak temperature is a decrease characteristic. Note that, in a case where linear approximation can be made on these characteristics, an increase straight line and a decrease straight line are included in the increase characteristic and the decrease characteristic.

In the present embodiment, the foaming characteristic of the stator-core-side foam material 32C is shifted to a cold side relative to the foaming characteristic of the coil-side foam material 32B. For example, in terms of the entire foaming characteristic including the increase characteristic, the peak temperature, and the decrease characteristic, the stator-core-side foam material 32C has a foaming characteristic shifted to a cold side relative to a foaming rate distribution of the coil-side foam material 32B. When the increase characteristic is shifted to a cold side, for example, the foaming starting temperature $T0\_s$ of the stator-core-side foam material 32C becomes less than the foaming starting temperature $T0\_c$ of the coil-side foam material 32B.

A shift width at this time is, for example, set based on a temperature difference between the coil 14 and the stator core 12 at the time of heating such that a maximum temperature difference therebetween is equal to the shift width, for example. Alternatively, the shift width is set such that an average value of the temperature difference between the coil 14 and the stator core 12 from a heating start to a time to reach a target temperature $Tp\_t$ is equal to the shift width. In short, the temperature difference between the coil 14 and the stator core 12 at the time of heating is compensated by the foaming characteristics of the foam materials 32B, 32C.

In order to obtain such a difference in the foaming characteristic between the stator-core-side foam material 32C and the coil-side foam material 32B, the foam materials should include different main components as appropriate, for example. Further, even if the main components of the foam materials are the same, the foaming characteristics are changed by changing a type and a combination of additives, which has been known conventionally. The stator-core-side foam material 32C and the coil-side foam material 32B may have different foaming characteristics by changing the additives as such.

Note that it is generally known that a foaming rate peak temperature of a foam material is not one point, but is a temperature zone with a width. In view of this, the foaming characteristics of those foam materials may be set so that a foaming rate peak temperature zone of the stator-core-side foam material 32C and a foaming rate peak temperature zone of the coil-side foam material 32B partially overlap with each other. As will be described later, when a target temperature of heating is set to a temperature $Tp\_t$ at which their foaming rate peak temperature zones overlap with each other and their foaming rates are equal to each other, a time necessary for an expansion course can be shortened.

Figure 5:
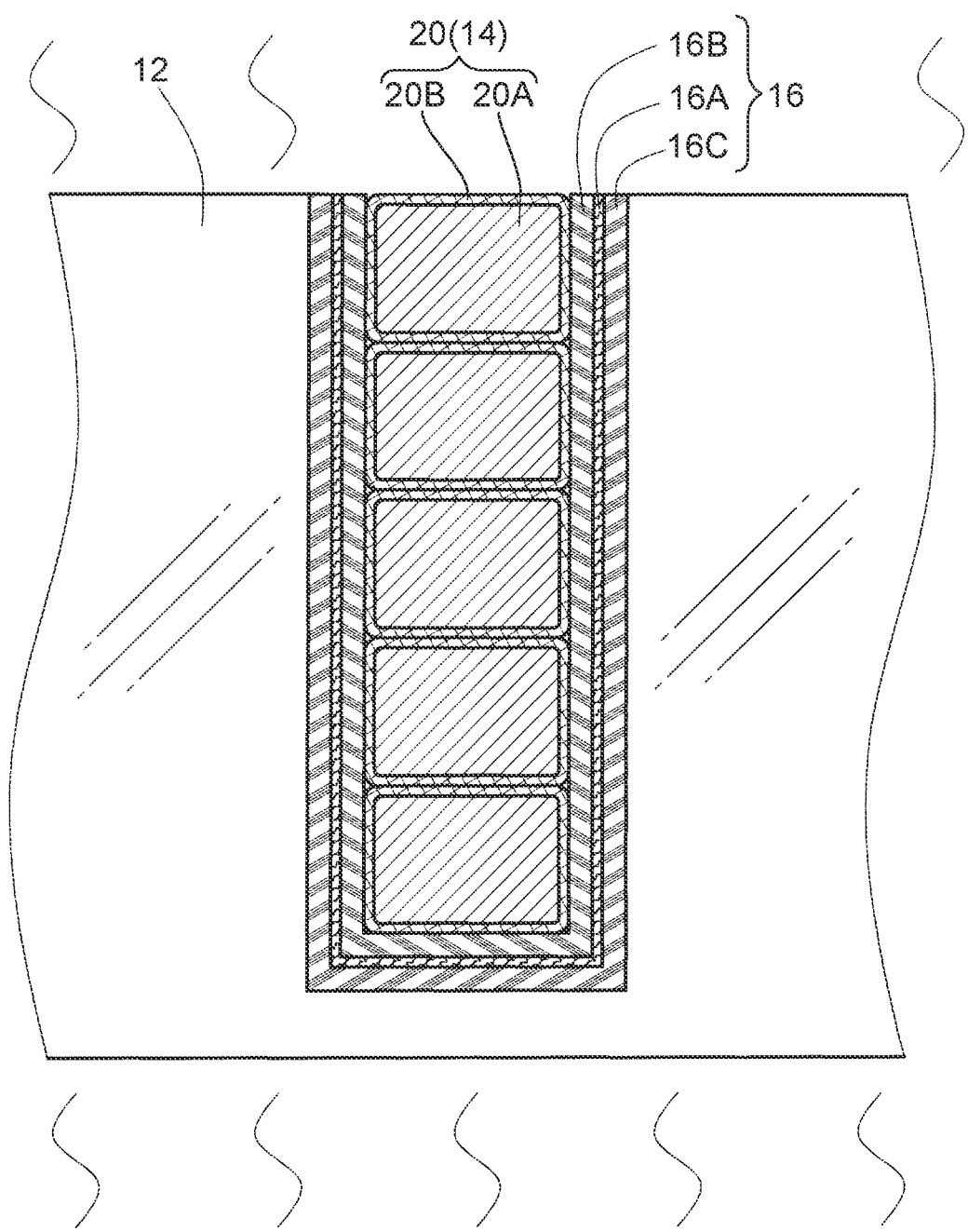
FIG. 5 is a view to describe an assembly step (a heating step) of the stator according to the present embodiment.

FIGS. 3 to 5 exemplify assembly steps of the stator according to the present embodiment. FIGS. 3 to 5 illustrates enlarged views around one slot 18 of the stator core 12. Note that FIGS. 3 to 5 are plan views of the stator core 12 when viewed from a sight line parallel to the Z-axis in FIG. 1.

First, the insulating material 16 is inserted into the slot 18 of the stator core 12. Subsequently, as illustrated in FIG. 4, the conductor segment 20 (more specifically, the leg portion 22A, 22B) is inserted into a lateral square-U-shaped space surrounded by the insulating material 16. Note that, in order to clearly illustrate its subsequent expansion course in FIG. 4, gaps are illustrated in the slot 18 intentionally.

After a predetermined number of conductor segments 20 is inserted into all the slot 18 of the stator core 12, the conductor segments 20 of the same phase are joined to each other by welding and the like, so that the coil 14 is formed. Joining portions are insulated. Further after that, a stator assembly in which the coil 14 and the insulating material 16 are assembled to the stator core 12 is put in a heating furnace so as to be heated, as illustrated in FIG. 5. Instead of the heating furnace, induction heating or electric heating to the coil 14 may be used. A heating target temperature may be, for example, the temperature $Tp\_t$ at which the peak temperature zone of the stator-core-side foam material 32C and the peak temperature zone of the coil-side foam material 32B overlap with each other and their foaming rates are the same.

Figure 6:
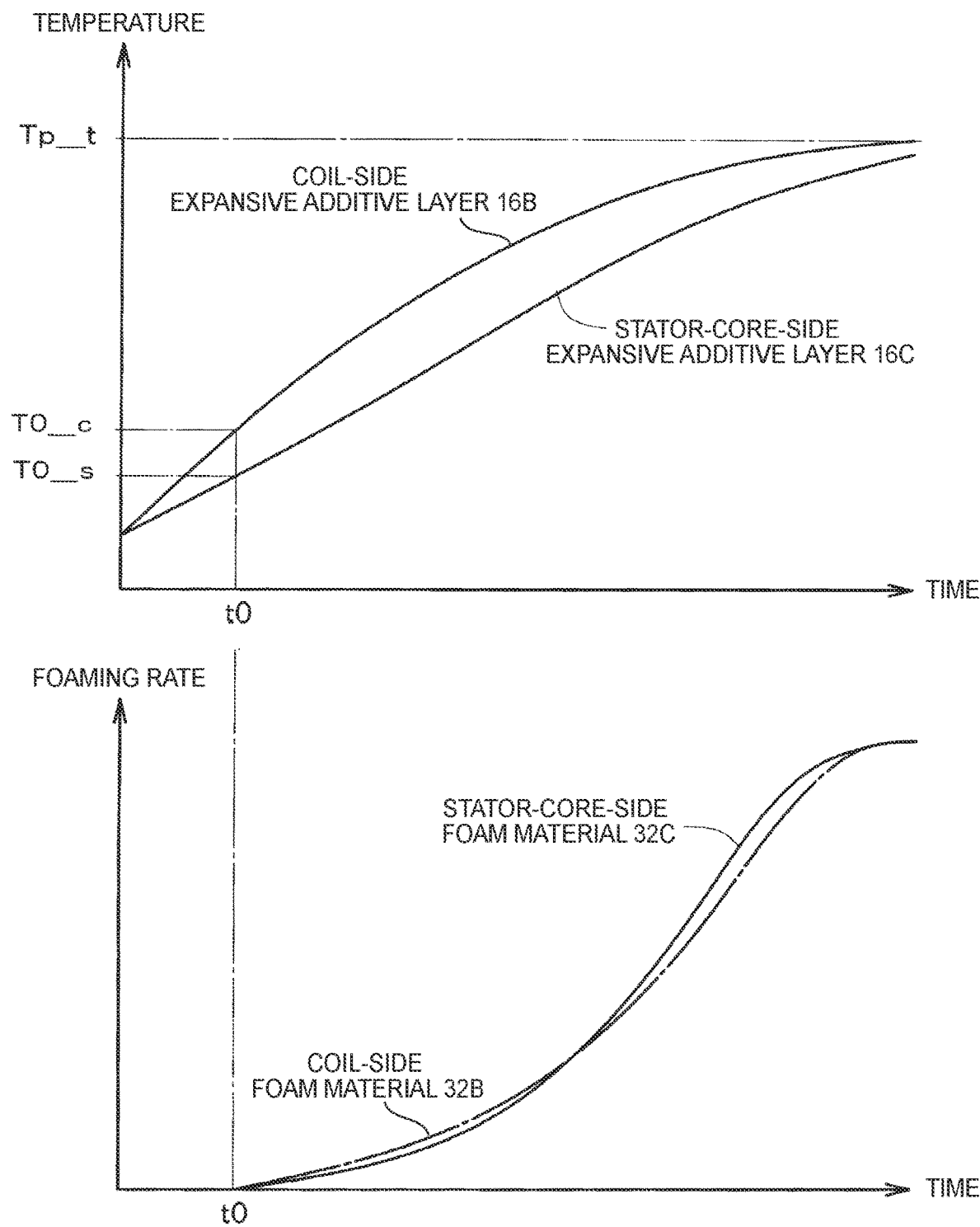
FIG. 6 is a view to describe a change in a foaming rate of the foam material in the heating step according to the present embodiment.
Figure 7:
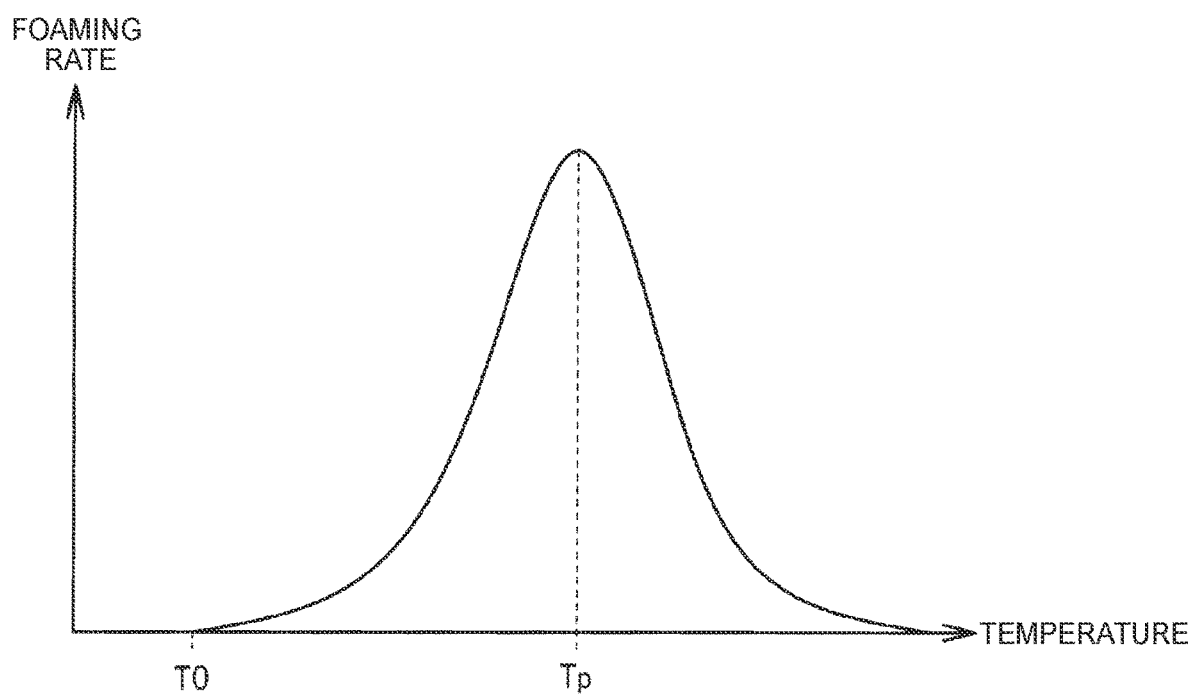
FIG. 7 is a view exemplifying the foaming characteristic of the foam material.
Figure 8:
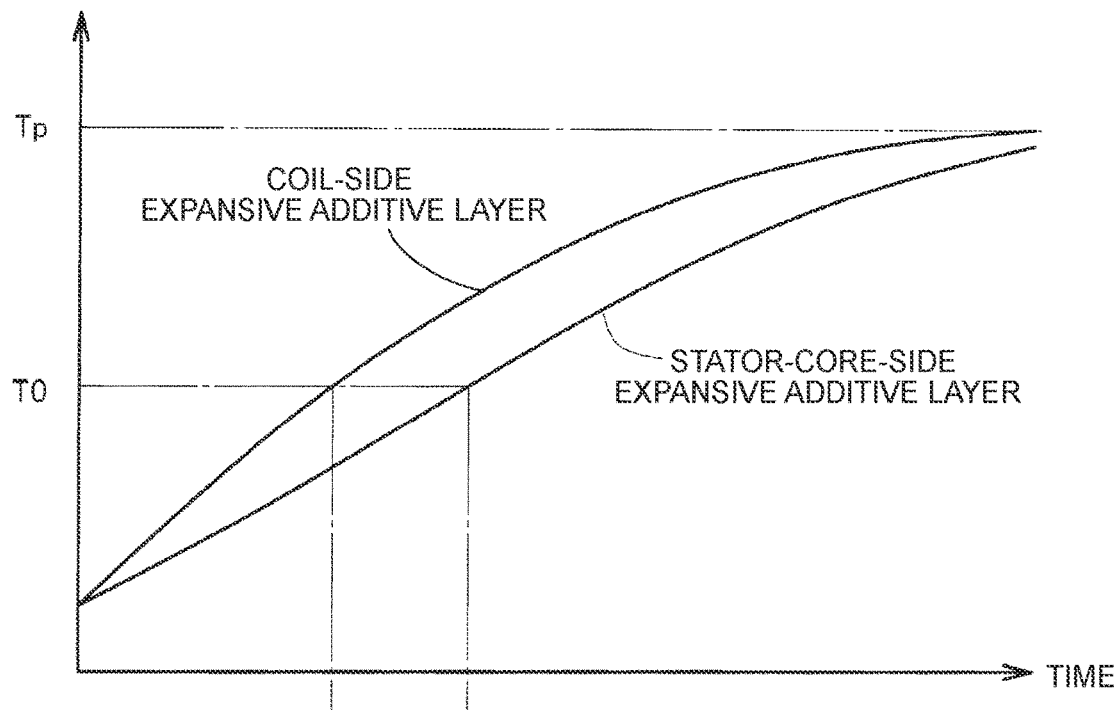
FIG. 8 is a view to describe a change in a foaming rate of a foam material in a heating step in a related art.
Figure 8:
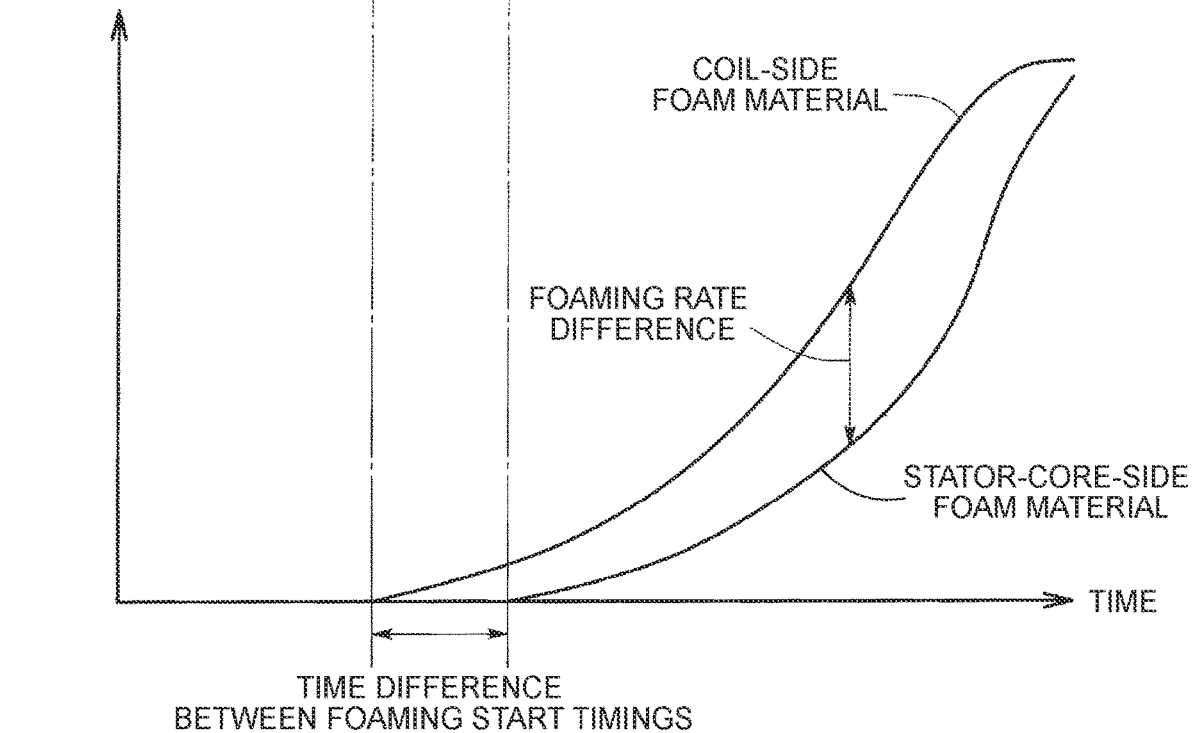
Figure 9:
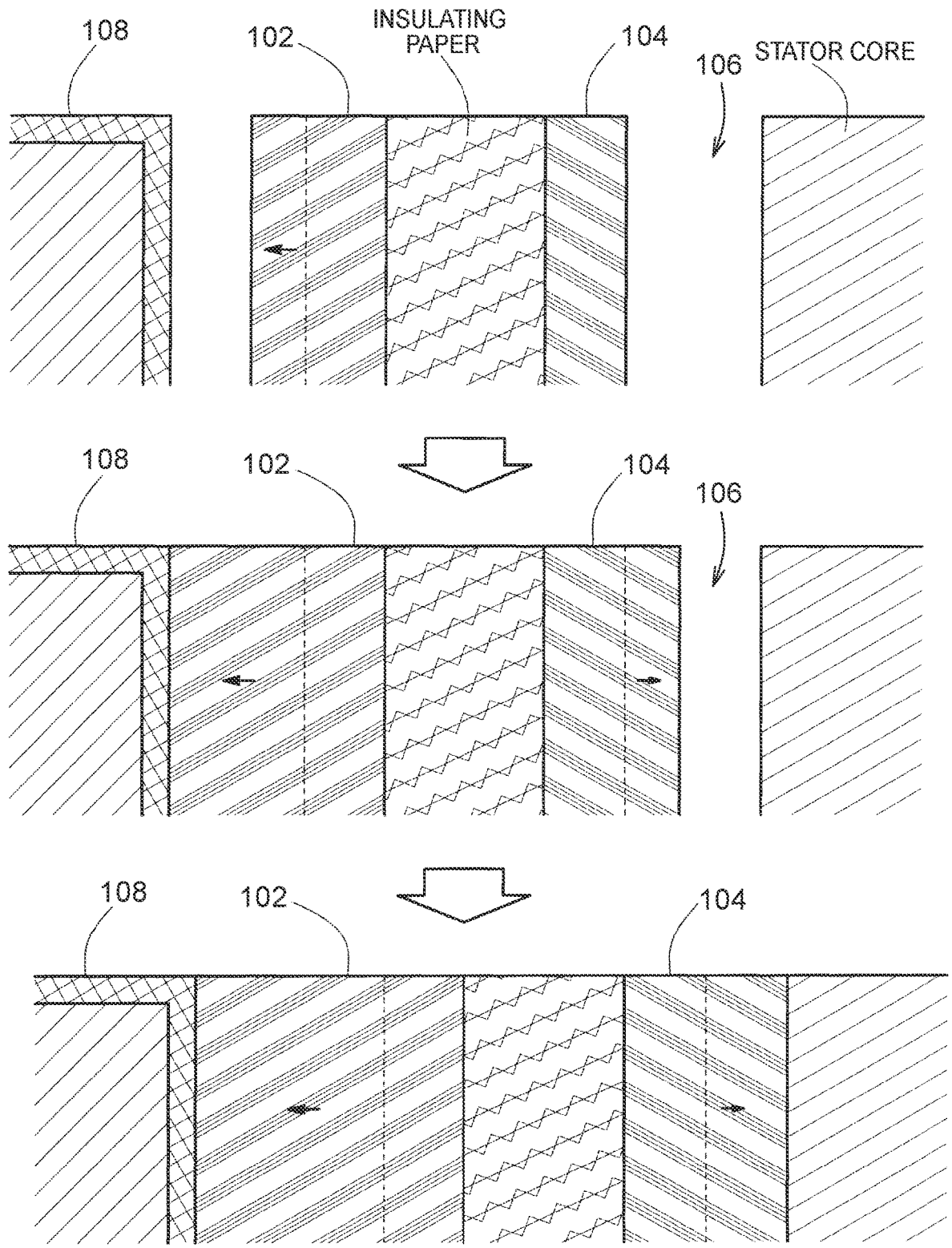
FIG. 9 is a view exemplifying an expansion course of an expansive additive layer in the heating step in the related art.

As described above, the temperature rise of the stator core 12 delays from the temperature rise of the coil 14 due to a difference in heat capacity between the stator core 12 and the coil 14, so that a temperature difference occurs therebetween. Along with this, a temperature difference occurs between the coil-side expansive additive layer 16B and the stator-core-side expansive additive layer 16C, as illustrated on an upper side in FIG. 6.

However, the stator-core-side foam material 32C according to the present embodiment has a foaming characteristic shifted to a cold side relative to the coil-side foam material 32B, and further, its shift width is preferably determined based on the temperature difference between the stator core 12 and the coil 14. Accordingly, even if the temperature difference occurs between the stator core 12 and the coil 14, respective foaming rates of the foam materials increase generally equally, as illustrated on a lower side in FIG. 6.

More specifically, at a time t0, the coil-side expansive additive layer 16B reaches the foaming starting temperature $T0\_c$ and the stator-core-side expansive additive layer 16c also reaches the foaming starting temperature $T0\_s$. Hereby, the coil-side expansive additive layer 16B and the stator-core-side expansive additive layer 16c start foaming at the same time. After that, the foaming rates of the coil-side foam material 32B and the stator-core-side foam material 32C increase uniformly, so that the coil-side expansive additive layer 16B and the stator-core-side expansive additive layer 16C expand to fill up the gaps in the slot 18 at a generally equal pace. Further, the base layers 30 of the expansive additive layers 16B, 16C cause an adhesiveness by heat, so as to adhere to an inner surface (an inner wall) of the slot 18 and a surface of the coil 14 (more specifically, the coating portion 20B of the coil 14).

When the gaps in the slot 18 are filled and an inside inflation pressure increases to a predetermined pressure, even if a foaming reaction occurs, there is no space where a volume can further expand, so an expansion coefficient reaches its limit. That is, a density decrease of the expansive additive layer 16B, 16C due to foaming expansion is restrained.

As described above, when either one of the coil-side expansive additive layer 16B and the stator-core-side expansive additive layer 16C is expanded excessively, its density decreases, which might lead to a decrease in retentivity. However, in the present embodiment, a temperature difference based on the difference in the temperature rise between the coil 14 and the stator core 12 is compensated by the foaming characteristics of the coil-side foam material 32B and the stator-core-side foam material 32C. Hereby, it is possible to equally increase the foaming rates of the coil-side foam material 32B and the stator-core-side foam material 32C at the time of heating of the stator assembly, so that the coil-side expansive additive layer 16B and the stator-core-side expansive additive layer 16C can have the same expansion volume. As such, the coil-side expansive additive layer 16B and the stator-core-side expansive additive layer 16C can have an expansion coefficient (magnification) in design, so that the overexpansion can be restrained and the decrease in retentivity can be restrained.

Note that, in the above embodiment, the coil-side expansive additive layer 16B and the stator-core-side expansive additive layer 16C include different foam materials 32B, 32C. However, in addition to this, an admixture of the stator-core-side foam material 32C and the coil-side foam material 32B may be included (dispersed) in the stator-core-side expansive additive layer 16C. With such a configuration, even if the heating target temperature is set to the peak temperature Tp_c of the coil-side foam material 32B, for example, it is possible to equalize respective expansion coefficients of the coil-side expansive additive layer 16B and the stator-core-side expansive additive layer 16C.

What is claimed is:

1. An insulating material for a coil, the insulating material being placed between a stator core and a coil, the insulating material being configured to insulate the coil from the stator core, the insulating material comprising:

an insulating sheet made of an insulating material;

a stator-core-side expansive additive layer laminated on a surface of the insulating sheet, the surface being opposed to the stator core, in a state where the insulating sheet is placed between the stator core and the coil, the stator-core-side expansive additive layer including a first foam material configured to foam by heating; and a coil-side expansive additive layer laminated on a surface of the insulating sheet, the surface being opposed to the coil, in a state where the insulating sheet is placed between the stator core and the coil, the coil-side expansive additive layer including a second foam material configured to foam by heating, wherein a foaming curve of a foaming rate of the first foam material which increases along with a temperature rise is shifted to a cold side relative to a foaming curve of a foaming rate of the second foam material.

2. The insulating material according to claim 1, wherein the first foam material and the second foam material reach their respective foaming starting temperatures at a same time during a state in which a temperature difference occurs between the stator core and the coil, and the coil-side expansive additive layer and the stator-core-side expansive additive layer expand to have a same expansion volume.

* * * * *